United States Patent
Ma et al.

(10) Patent No.: US 6,462,752 B1
(45) Date of Patent: Oct. 8, 2002

(54) AUTOMATIC SCROLLING FUNCTION FOR EDITORS AND BROWSERS

(75) Inventors: William H. L. Ma, Fishkill; Wayne M. Delia, Poughkeepsie; William A. Ma, Wappingers Falls, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/441,028

(22) Filed: Nov. 16, 1999

(51) Int. Cl.[7] .................................................. G09G 5/00
(52) U.S. Cl. ........................................ 345/684; 345/785
(58) Field of Search ................................ 345/684–688, 345/784–786

(56) References Cited

U.S. PATENT DOCUMENTS

| | | | | |
|---|---|---|---|---|
| 4,841,454 A | * | 6/1989 | Awazu ........................ | 345/684 |
| 5,239,665 A | | 8/1993 | Tsuchiya .................... | 395/800 |
| 5,528,260 A | | 6/1996 | Kent .......................... | 345/123 |
| 5,798,749 A | | 8/1998 | Minematsu et al. ........ | 345/123 |
| 5,801,713 A | | 9/1998 | Endo et al. ................. | 345/473 |
| 5,850,211 A | | 12/1998 | Tognazzini ................ | 345/158 |
| 5,883,619 A | | 3/1999 | Ho et al. .................... | 345/163 |

FOREIGN PATENT DOCUMENTS

| | | |
|---|---|---|
| JP | 06231187 A | 8/1994 |
| JP | 07141398 A | 6/1995 |
| JP | 07175624 A | 7/1995 |
| JP | 07295999 A | 11/1995 |
| JP | 07319899 A | 12/1995 |
| JP | 08106469 A | 4/1996 |
| JP | 09198033 A | 7/1997 |

OTHER PUBLICATIONS

Kashyap, P., Automatic Scrolling Mail Reader, 10/98, RD v41 n414, Article 41476.
Kashyap, P., Automatic Scrolling Browser, 9/98, RD v41 n413, Article 413119.

* cited by examiner

*Primary Examiner*—Michael Razavi
*Assistant Examiner*—Gary Kless
(74) *Attorney, Agent, or Firm*—Jay H. Anderson; James J. Cioffi

(57) ABSTRACT

An automatic scrolling and paging function is provided for use with an object/text editor or a browser, in which either scrolling or paging is automatically performed at a variable speed. A delay time is set as a parameter for control of the display; automatic display of the document is commenced by displaying a first portion of the document; a subsequent portion of the document is displayed after expiration of the delay time; and the display of portions of the document is iterated until the entire document has been displayed. The delay time is reset during the automatic display, thereby changing the rate at which successive portions of the document are displayed. The delay time may depend upon the location of the portion of the document; accordingly, successive portions of the document may be automatically displayed at a varying rate.

18 Claims, 3 Drawing Sheets

AUTOMATIC SCROLLING FUNCTION FOR EDITORS AND BROWSERS

FIELD OF THE INVENTION

This invention relates to software applications, such as object/text editors and browsers, in connection with which documents are displayed. More particularly, this invention relates to an automatic scrolling or paging function for such documents.

BACKGROUND OF THE INVENTION

A document displayed on a screen by a text editor or browser is often too long to be viewed in its entirety. In general, a user must bring new lines into view, one at a time ("scrolling") or must switch from one page of the document to another ("paging"). Conventional scrolling and paging methods generally require manual intervention by the user, such as pressing a "Page Down" key, or clicking a mouse on a vertical line-scrolling slider bar provided by the editor or browser. This can be a tedious process for the user, particularly when it is desired to skim over a lengthy document rapidly. Furthermore, a user frequently desires to scroll through a document at a variable speed—for example, slowly at the beginning of an on-line newspaper article, and more quickly thereafter. In many applications, the speed and consistency of the scrolling depend upon the user's ability to manipulate a pointer, controlled by a mouse, with respect to the slider bar; either holding the pointer steady, or moving the pointer at a constant rate up or down the slider bar.

Automatic scrolling methods have been proposed in Japanese patent publication JP 09-198033 and in Research Disclosure vol. 41, p. 1388 (October 1998). These scrolling methods are limited to line-by-line scrolling at a constant scrolling rate.

There is a need for an automatic scrolling/paging capability in editors and browsers, so that scrolling and paging can be performed at a fixed or variable speed, without requiring manual intervention by the user.

SUMMARY OF THE INVENTION

The present invention addresses the above-described need by providing an automatic scrolling and paging function for use with an object/text editor or a browser, in which either scrolling or paging is automatically performed at a variable speed. In accordance with the present invention, this is done by setting a delay time as a parameter for control of the display; commencing an automatic display of the document by displaying a first portion of the document; displaying a subsequent portion of the document after expiration of the delay time; and iterating the display of portions of the document until the entire document has been displayed. The delay time is reset during the automatic display, thereby changing the rate at which successive portions of the document are displayed.

The resetting of the delay time is performed by adding a time increment to the delay time or subtracting a time increment from the delay time; this time increment is set as an additional parameter for control of the display. The delay time and time increment may be set according to default values or may be selected by the user. The automatic display of the document may also be suspended in accordance with an input from the user.

According to another aspect of the invention, each portion of the document has a delay time associated therewith whose length depends upon the location of that portion in the document; accordingly, successive portions of the document are displayed at a varying rate.

According to a further aspect of the invention, a display mode (that is, either paging or scrolling) is set as a parameter for control of the display, in accordance with an input from the user.

In accordance with an additional aspect of the invention, a computer-readable storage medium is provided which has stored therein instructions for performing an automated method for facilitating display of a document to a user; this automated method includes the steps of setting a delay time, commencing an automatic display of the document, displaying a subsequent portion of the document, iterating the display of portions of the document, and resetting the delay time during the automatic display, as described above.

In accordance with a further aspect of the invention, a computer program product is provided which comprises instructions for performing an automated method for facilitating display of a document to a user; this method includes the above-described steps of setting a delay time, commencing an automatic display of the document, displaying a subsequent portion of the document, iterating the display of portions of the document, and resetting the delay time during the automatic display.

DETAILED DESCRIPTION OF THE PREFERRED EMBODIMENTS

Figure 1:
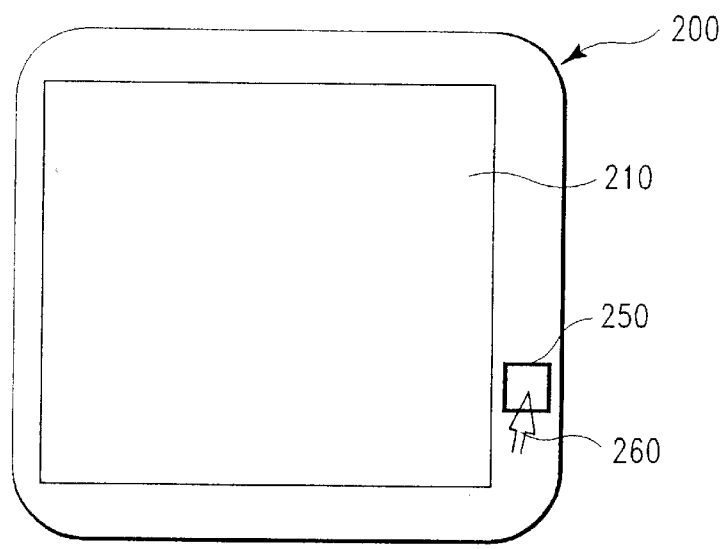
FIG. 1 is a schematic illustration of a display of a document, and an activation button for an automatic scrolling/paging function in accordance with the present invention.

According to a preferred embodiment of the invention, automatic or "hands-free" scrolling/paging through a document is provided by a software routine which is activated by "pressing" a button or icon in the document display. For example, as shown in FIG. 1, the display 200 may show the document 210 and an activation button 250 next to the document. Using a mouse to move pointer 260 to the button 250, then clicking a mouse button, serves to activate the automatic scrolling/paging function. Alternatively, a particular keystroke or combination of keystrokes on a keyboard could be defined as the activation signal for the automatic scrolling/paging function.

Figure 2:
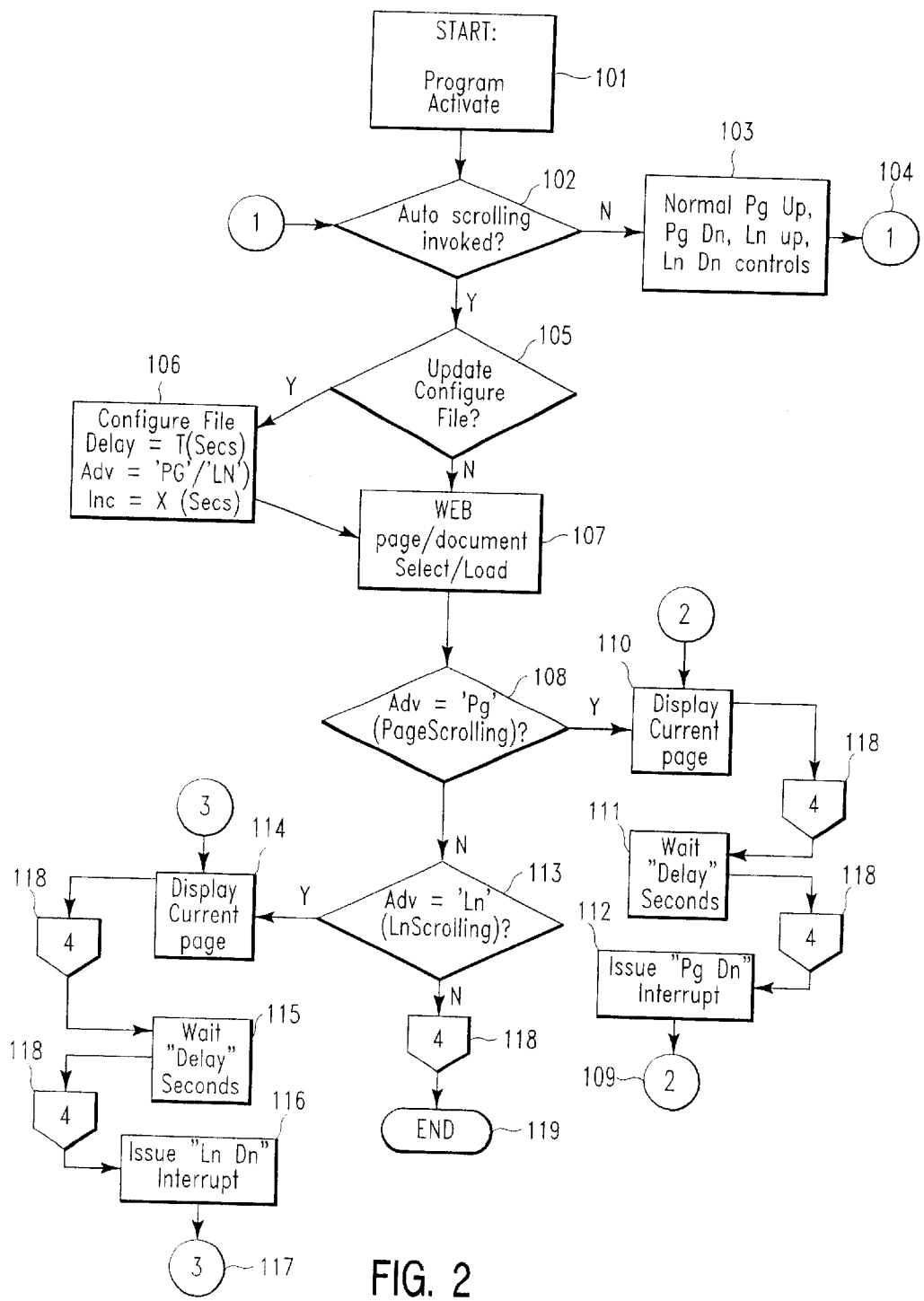
FIG. 2 is a flowchart showing steps in a computer operation wherein the automatic scrolling/paging function of the present invention is invoked.

A flowchart of operations of a computer (such as a PC or workstation), on which a document is displayed in conjunction with a browser or text editor and wherein the automatic scrolling/paging procedure of the present invention may be invoked, is shown in FIG. 2. The browser or editor program is activated (step 101), and then checks whether the automatic scrolling/paging function has been activated (step 102). If automatic scrolling/paging has not been activated (step 103), scrolling and paging in the editor or browser is controlled in the conventional manner—that is, using "Page Up" and "Page Down" keys, directional arrow keys, or a slider bar on the edge of the displayed document controlled by a pointer responding to movement of a mouse. The editor or browser executes an iterative loop (step 104) to repeatedly check whether the user has activated the automatic scrolling/paging function.

Figure 3:
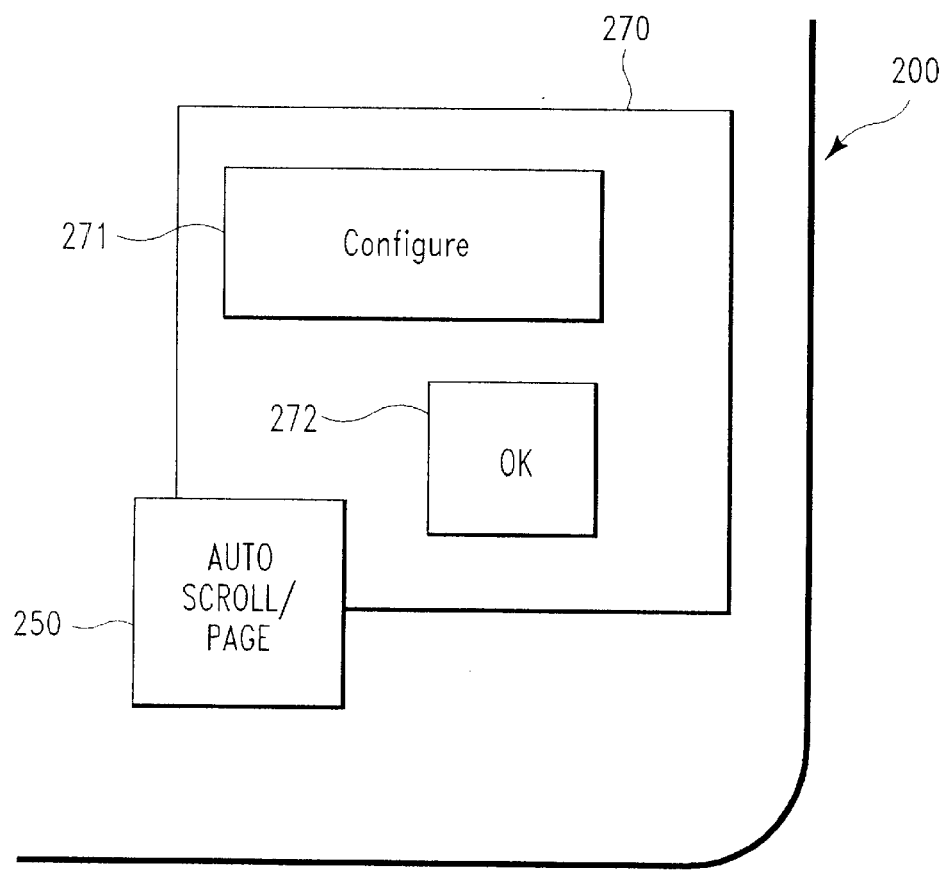
FIG. 3 is a schematic illustration of a box appearing on a display screen when the automatic function of the present invention is invoked, with a button permitting a configuration file to be updated.

If the automatic scrolling/paging has been activated, the user is then given an opportunity to update a file (the configuration file) of parameters for configuring the scrolling/paging function (step 105). For example (see FIG. 3), clicking on the activation button 250 may cause a box 270 to appear on the screen, with two additional buttons 271, 272 labeled "Configure" and "OK" respectively. If the user then clicks on the "Configure" button 271, he is presented with a menu of parameters which may be updated (step 106).

The configuration parameters include (1) the initial delay time (the time between successive line scroll or page operations); (2) the mode of automatic advance through the document (line scrolling or paging); and (3) the time increment (the amount of time added to or subtracted from the initial delay time when the scrolling or paging speed is manually controlled). Each of these parameters has initial default values which may be changed by the user. The user is thus able to set the speed at which new lines or pages of the document are displayed on the screen.

After the configuration file is updated (or if no updating is performed, indicated for example by the user clicking on the "OK" button 272), the desired document is retrieved and displayed in step 107. It will be appreciated that the document may be a user-created document, a Web page, or any other text-based object, and may be stored in a local memory device or retrieved from a remote memory over some suitable communication link such as the Internet.

If the mode of advance in the configuration file is "Page" (step 108), then a page is displayed. After the delay time has elapsed, a "Page Down" interrupt is issued to the operating system, causing a new page to be displayed (steps 111, 112). The delay time is the initial delay time in the configuration file, adjusted by the time increment specified by the user, as described in more detail below. The process of displaying a page, waiting a prescribed delay time, and generating a "Page Down" interrupt is then iterated (step 109). During this process, in which successive pages are automatically displayed at predetermined time intervals, the user may speed up or slow down the automatic paging or de-activate the automatic paging function (step 118, representing a subroutine detailed below).

If the mode of advance in the configuration file is "Line" (step 113), then a page is displayed (step 114), and a "Line Down" interrupt is generated after the elapse of the delay time set in the configuration file (steps 115, 116). This process is iterated (step 117), so that the display is refreshed with one new line shown after each delay time period elapses. The user may also speed up or slow down the automatic scrolling or de-activate the automatic scrolling function (step 118).

Figure 4:
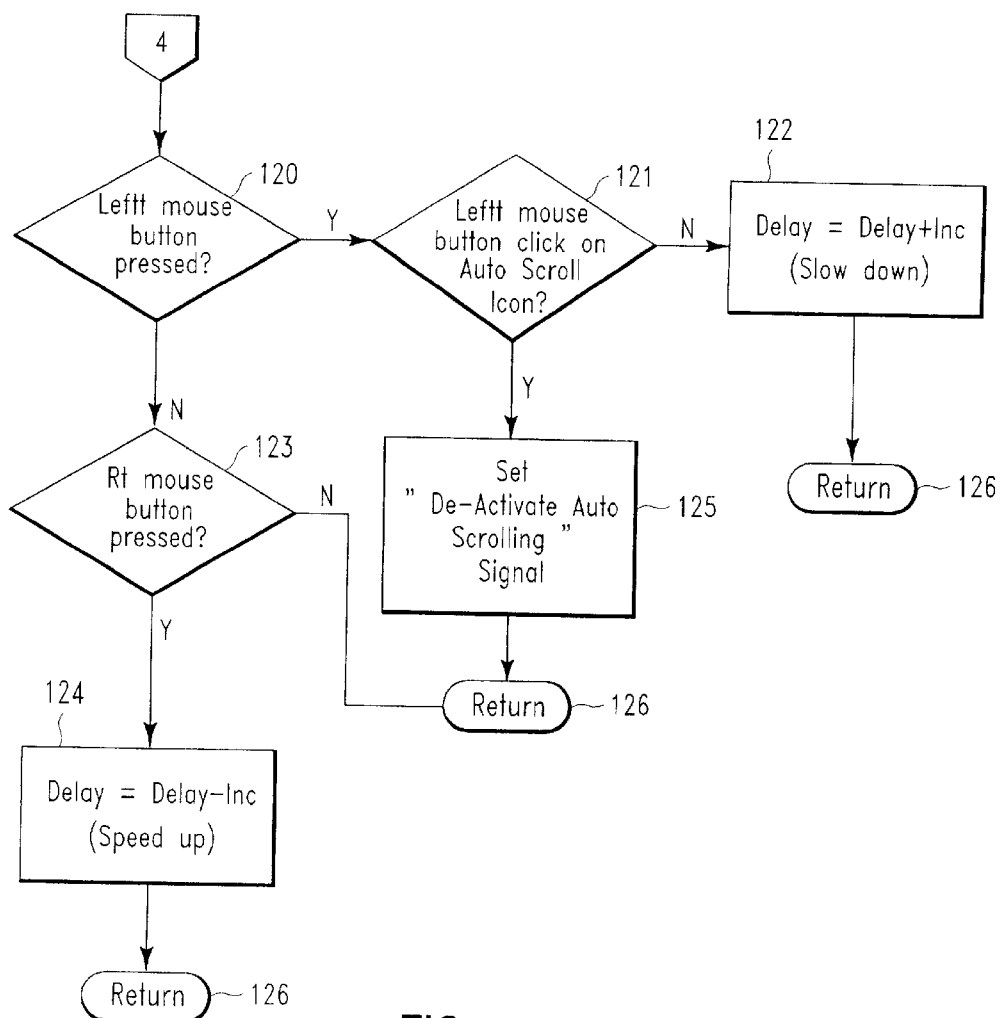
FIG. 4 is a flowchart showing steps in a subroutine for accelerating, decelerating or de-activating the automatic scrolling/paging function, in accordance with an embodiment of the invention.

Step 118 is a call to a subroutine in which the automatic scrolling or paging may be accelerated, decelerated or terminated by manual intervention from the user. The steps shown in the flowchart of FIG. 4 illustrate one possible embodiment of this feature. Here, the right and left mouse buttons respectively are used to speed up and slow down the automatic paging or scrolling. If the left mouse button has been pressed (step 120), but has not been clicked on the "Auto Scroll" icon or activation button 250, the delay time is modified by adding the time increment to the current delay time (step 122). Since the time interval between page or line advances has been increased, the paging or scrolling is slowed down. If instead the right mouse button has been pressed (step 123), the delay time is modified by subtracting the time increment from the current delay time, thereby shortening the delay time and speeding up the automatic paging or scrolling (step 124). If, however, the left mouse button has been clicked on the "Auto Scroll" icon or activation button 250 (step 121), the automatic scrolling/paging function is to be de-activated; a signal to this effect is set in step 125. Finally, the result of this subroutine (new delay time or de-activation signal) is returned to the browser or editor program (step 126) at the point where the subroutine call was made (see FIG. 2).

In this embodiment, if the user wishes to temporarily halt automatic scrolling to read a portion of the document more closely, he simply clicks on the activation button 250 with the left mouse button, and then clicks again with the same mouse button when he wishes automatic scrolling to resume.

Alternatively, a specific key or combination of keystrokes may be specified as the automatic scrolling/paging accelerator, decelerator, and de-activation indicator, respectively.

In the above-described embodiments, the user may manually intervene during the automatic scrolling/paging to change the speed at which the scrolling or paging is performed. In a further embodiment, the configuration file is expanded to specify different delay times for different portions of the document, so that the scrolling/paging is performed with an automatically varying speed. For example, the delay time for scrolling may be set at 2.0 sec for lines 1–20 of the document, 1.0 sec for lines 21–40, and 0.6 sec for lines numbered 41 and higher. Alternatively, the delay time may be set to automatically decrease with each line; for example, 2.0 sec at line 1, 1.95 sec at line 2, etc., to a minimum of 0.5 sec at line 31 and subsequent lines. These arrangements are useful for reading documents such as newspaper articles, where the most important information is at the beginning of the document.

The automatic scrolling/paging function described herein permits a user to read an entire document "hands free," with a preset constant or varying scrolling speed. The user may override the preset speed during scrolling or paging—speeding up, slowing down or halting the automatic scrolling/paging function. The user also may select the mode in which the document is displayed: paging or scrolling. Accordingly, the user may scan a document with greater efficiency and comprehension.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A method for facilitating display of a document to a user, the document having a plurality of portions, the method comprising the steps of;
    (a) setting a delay time as a parameter for control of the display;
    (b) commencing an automatic display of the document by displaying a first portion of the document;
    (c) displaying a subsequent portion of the document after expiration of the delay time, (d) iterating step (c) until the entire document has been displayed;

(e) resetting the delay time, during one of steps (b), (c) and (d), thereby changing a rate at which successive portions of the document are displayed; and (f) setting a display mode as a parameter for control of the display, in accordance with an input from the user, wherein the display mode is one of paging and scrolling and wherein when the display mode is scrolling the first portion is displayed as a page of the document, and each subsequent portion is an additional line of the document.

2. A method according to claim 1, further comprising the step of setting a time increment as an additional parameter for control of the display, and wherein the resetting of the delay time is performed by one of adding the time increment to the delay time and subtracting the time increment from the delay time.

3. A method according to claim 2, wherein the delay time and the time increment are selected by the user, and the resetting of the delay time is performed in accordance with an input from the user.

4. A method according to claim 1, further comprising the step of suspending the automatic display of a subsequent portion of the document, in accordance with an input from the user.

5. A method according to claim 1, wherein each portion of the document has a delay time associated therewith whose length depends upon the location of said portion in the document, so that successive portions of the document are displayed at a varying rate.

6. A method according to claim 1, wherein when the display mode is paging the first portion is displayed as a page of the document, and each subsequent portion is an additional page of the document.

7. A computer-readable storage medium having stored therein instructions for performing an automated method for facilitating display of a document to a user, the document having a plurality of portions, the method comprising the steps of:

(a) setting a delay time as a parameter for control of the display;

(b) commencing an automatic display of the document by displaying a first portion of the document;

(c) displaying a subsequent portion of the document after expiration of the delay time;

(d) iterating step (c) until the entire document has been displayed;

(e) resetting the delay time, during one of steps (b), (c) and (d), thereby changing a rate at which successive portions of the document are displayed; and (f) setting a display mode as a parameter for control of the display, in accordance with an input from the user, wherein the display mode is one of paging and scrolling, and wherein when the display mode is scrolling the first portion is displayed as a page of the document, and each subsequent portion is an additional line of the document.

8. A computer-readable storage medium according to claim 7, wherein the automated method further comprises the step of setting a time increment as an additional parameter for control of the display, and wherein the resetting of the delay time is performed by one of adding the time increment to the delay time and subtracting the time increment from the delay time.

9. A computer-readable storage medium according to claim 8, wherein the delay time and the time increment are selected by the user, and the resetting of the delay time is performed in accordance with an input from the user.

10. A computer-readable storage medium according to claim 7, wherein the automated method further comprises the step of suspending the automatic display of a subsequent portion of the document, in accordance with an input from the user.

11. A computer-readable storage medium according to claim 7, wherein each portion of the document has a delay time associated therewith whose length depends upon the location of said portion in the document, so that successive portions of the document are displayed at a varying rate.

12. A computer-readable storage medium according to claim 7, wherein when the display mode is paging the first portion is displayed as a page of the document, and each subsequent portion is an additional page of the document.

13. A computer program product comprising instructions for performing an automated method for facilitating display of a document to a user, the document having a plurality of portions, the method including the steps of:

(a) setting a delay time as a parameter for control of the display, (b) commencing an automatic display of the document by displaying a first portion of the document, (c) displaying a subsequent portion of the document after expiration of the delay time;

(d) iterating step (c) until the entire document has been displayed;

(e) resetting the delay time, during one of steps (b), (c) and (d), thereby changing a rate at which successive portions of the document are displayed; and (f) setting a display mode as a parameter for control of the display, in accordance with an input from the user, wherein the display mode is one of paging and scrolling, and wherein when the display mode is scrolling the first portion is displayed as a page of the document, and each subsequent portion is an additional line of the document.

14. A computer program product according to claim 13, wherein the automated method further comprises the step of setting a time increment as an additional parameter for control of the display, and wherein the resetting of the delay time is performed by one of adding the time increment to the delay time and subtracting the time increment from the delay time.

15. A computer program product according to claim 14, wherein the delay time and the time increment are selected by the user, and the resetting of the delay time is performed in accordance with an input from the user.

16. A computer program product according to claim 13, wherein the automated method further comprises the step of suspending the automatic display of a subsequent portion of the document, in accordance with an input from the user.

17. A computer program product according to claim 13, wherein each portion of the document has a delay time associated therewith whose length depends upon the location of said portion in the document, so that successive portions of the document are displayed at a varying rate.

18. A computer program product according to claim 13, wherein when the display mode is paging the first portion is displayed as a page of the document, and each subsequent portion is an additional page of the document.

* * * * *